United States Patent [19]

McCauley et al.

[11] Patent Number: 5,062,325
[45] Date of Patent: Nov. 5, 1991

[54] PIPE PLUG AND CENTERING CONSTRUCTION FOR CENTERING RIDGED KEY IN MATING GROOVE IN PIPE PLUG OR NUT

[75] Inventors: Durham S. McCauley; Jeffrey R. Sullivan, both of Boston, N.Y.

[73] Assignee: McGard, Inc., Orchard Park, N.Y.

[21] Appl. No.: 302,062

[22] Filed: Jan. 26, 1989

Related U.S. Application Data

[60] Continuation of Ser. No. 100,536, Sep. 24, 1987, abandoned, which is a division of Ser. No. 900,975, Aug. 27, 1986, Pat. No. 4,712,586, which is a continuation of Ser. No. 732,675, May 10, 1985, abandoned.

[51] Int. Cl.[5] ............................................. B25B 13/48
[52] U.S. Cl. ..................................... 81/436; 411/311; 411/911; 138/89
[58] Field of Search .................. 70/158, 163, 170; 81/176.15, 176.2, 436, 451, 460, 461; 138/89, 96 R, 96 T; 215/207, 215, 296; 270/210, 233, 235, 284; 411/307, 311, 333, 403, 405, 407, 410, 429, 910, 911

[56] References Cited

U.S. PATENT DOCUMENTS

| | | | |
|---|---|---|---|
| 271,852 | 2/1883 | Hull | 411/311 |
| 2,556,155 | 6/1951 | Stellin | 411/410 X |
| 4,018,111 | 4/1977 | Goldhaber | 81/436 |
| 4,223,585 | 9/1980 | Barth et al. | 411/911 X |
| 4,686,874 | 8/1987 | McCauley et al. | 411/410 X |

*Primary Examiner*—James G. Smith
*Attorney, Agent, or Firm*—Joseph P. Gastel

[57] ABSTRACT

A pipe plug which cannot be removed from a pipe with the same key with which it is installed, the pipe plug having a body with a plurality of arcuate grooves having inclined arcuate ramps leading from its face into its body and terminating at shoulders for abutting engagement with first key having pins which bear against the shoulders to tighten the plug in the pipe but which cannot loosen the plug because the pins will ride up the ramps and cam out of engagement with the plug, and a second key for removing the plug including a ridge on the second key for mating with a complementary curvilinear groove in the plug. A counterbore is provided in the face of the plug to receive portions of the ridge which are of substantially the same diameter as the counterbore to thereby center the second key with respect to the plug and guide it while the second key is rotated until the ridge thereon falls into the groove to effect mating engagement therewith.

20 Claims, 2 Drawing Sheets

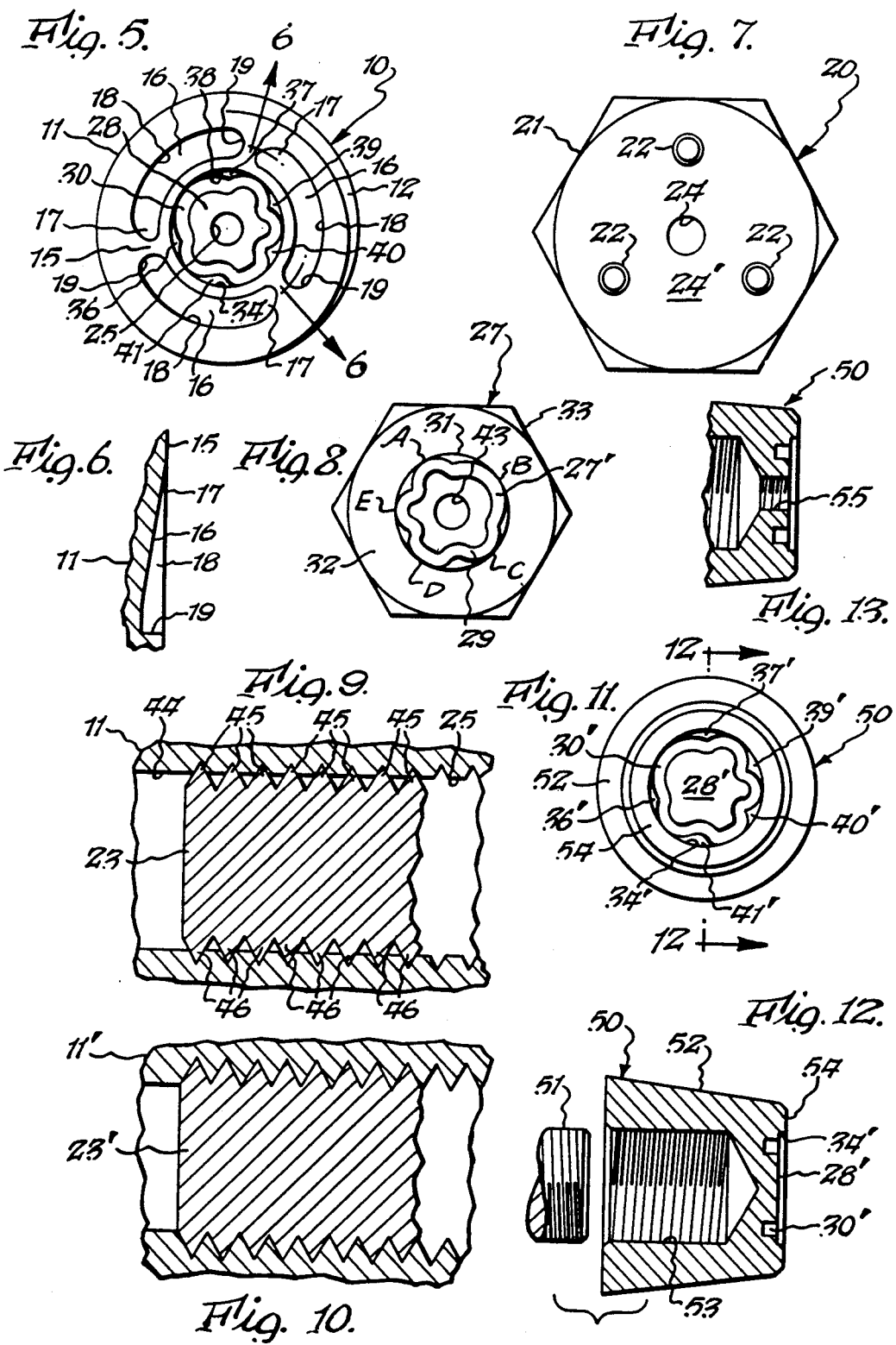

PIPE PLUG AND CENTERING CONSTRUCTION FOR CENTERING RIDGED KEY IN MATING GROOVE IN PIPE PLUG OR NUT

This application is a continuation of application Ser. No. 100,536 filed Sept. 24, 1987, abandoned which is a division of application Ser. No. 900,975, U.S. Pat. No. 4,712,586, filed Aug. 27, 1986, which is a continuation of application Ser. No. 732,675 filed May 10, 1985, abandoned.

BACKGROUND OF THE INVENTION

The present invention relates to an improved plug which can be installed into a pipe with an installation key but can be removed only with a removal key, and it also relates to an improved structure for aligning a key having a curved ridge with the mating curved groove of a plug or a nut.

By way of background, in certain instances it is necessary to have a type of plug which can be installed in a pipe by many people but which can be removed only by a select few people having a special removal key. This type of plug is generally used where it is necessary to shut off a gas meter or water meter. In situations of this type the plugs can be installed by numerous personnel who are sent out on routine calls for this purpose. However, it is desirable that the task of removing the plugs be delegated to only a few select personnel to whom removal keys are entrusted. By following this procedure, there need be only very few removal keys in existence, and therefore the risk of these keys being duplicated for unauthorized removal of plugs is greatly diminished.

SUMMARY OF THE INVENTION

It is accordingly the primary object of the present invention to provide a pipe plug which can be installed in a pipe with a first type of key which cannot be used to remove the plug, and which can only be removed by the use of a second type of key available only to a limited number of personnel.

Another object of the present invention is to provide an improved construction for facilitating the insertion of a key having an irregular curved ridge thereon into an irregular curved groove in a body portion of a member such as a nut or plug. Other objects and attendant advantages of the present invention will readily be perceived hereafter.

The present invention relates to a pipe plug comprising a body having an axis, threads on said body, a face on said body, a plurality of arcuate ramps on said face, said arcuate ramps being oriented about said axis, each of said ramps having a first end and a second end and a surface which leads away from said face and which extends a greater distance into said body as it progresses toward said second end from said first end and terminates at a shoulder at said second end, said threads on said body having a tightening direction which is the same as the direction of said ramps leading toward said shoulders, and a curvilinear key-receiving groove in said face, said curvilinear groove being oriented about said axis.

The present invention also relates to a body member having an axis of rotation, threads on said body member for mounting said body member on an object, a face on said body member which is transverse to said axis of rotation, a curvilinear key-receiving groove in said face, and a counterbore in said face surrounding said groove. The various aspects of the present invention will be more fully understood when the following portions of the specification are read in conjunction with the accompanying drawings wherein:

BRIEF DESCRIPTION OF THE DRAWINGS

FIG. 4A is a fragmentary view similar to FIG. 4 but showing the relative positions of the plug and key when the ridge of the key is first inserted into the counterbore and before it is seated wherein;

FIG. 5 is a view of the face of the plug taken substantially in the direction of arrows 5—5 of FIG. 1;

FIG. 6 is a fragmentary cross sectional view taken substantially along line 6—6 of FIG. 5 and showing the inclination of one of the ramps in the face of the pipe plug;

FIG. 7 is a view of the plug installing key taken substantially in the direction of arrows 7—7 of FIG. 1;

FIG. 8 is a view of the face of the plug removal key taken substantially in the direction of arrows 8—8 of FIG. 2;

FIG. 9 is an enlarged cross sectional view taken substantially in the direction of line 9—9 of FIG. 3 and showing the degree of engagement between the internal threads in the pipe plug and the threads on the bolt for holding the plug installing key in engagement with the pipe plug;

FIG. 10 is a cross sectional view similar to FIG. 9 but showing the normal degree of engagement between the threads on a bolt and the internal threads of a bore which it engages;

FIG. 11 is a view of the face of a nut having an endless curvilinear groove and a counterbore for receiving a key having a ridge for mating engagement with the curvilinear groove;

FIG. 12 is a fragmentary cross sectional view taken substantially along line 12—12 of FIG. 11; and FIG. 13 is a cross sectional view similar to FIG. 12 but showing a modified embodiment of the nut shown therein.

DESCRIPTION OF THE PREFERRED EMBODIMENTS

Figure 1:
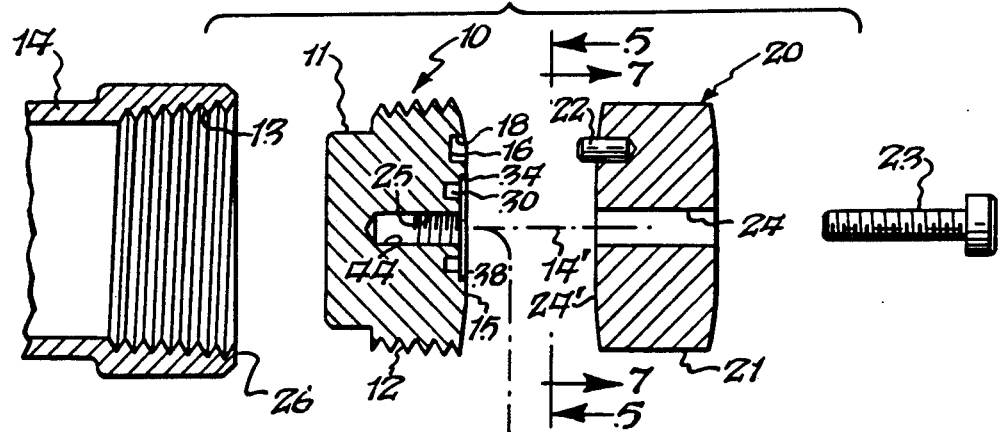
FIG. 1 is a fragmentary exploded cross sectional view showing the improved pipe plug of the present invention relative to a pipe into which it is to be inserted and also showing the key for threading the plug into the pipe.
Figure 2:
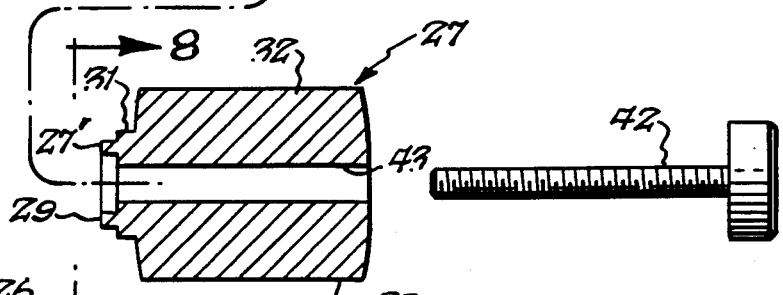
FIG. 2 is an exploded cross sectional view of the key for unscrewing the plug from the pipe.

The pipe plug 10 includes a body 11 having a helical thread 12 thereon for mating engagement with internal threads 13 of pipe 14. Body 11 has an axis of rotation 14' and a substantially planar face 15 which is located at the outer end of body 11 and which extends transversely to axis 14'. A plurality of arcuate grooves 18 are positioned in face 15 with axis 14' at the center of rotation of each groove. At the bottom of each groove is a ramp 16. Each ramp 16 includes a first end 17 which is at substantially the same level as face 15 and it includes a second end which terminates at a shoulder 19 in body 11.

Figure 3:
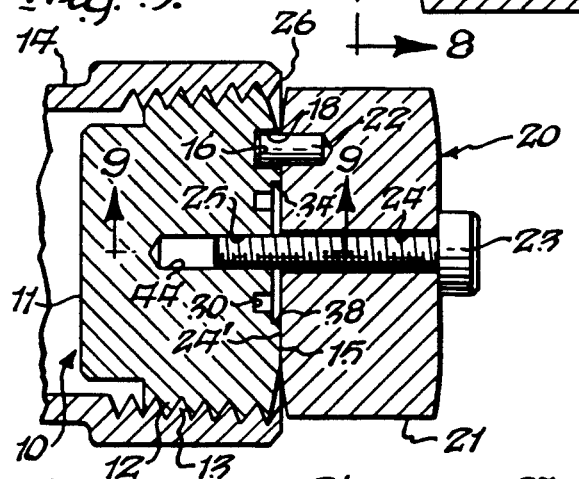
FIG. 3 is a cross sectional view showing the plug installing key and plug in assembled relationship with the plug in its installed position in a pipe.

In order to install plug 10 in pipe 14, a key 20 is used. Key 20 is in the shape of a nut having a hexagonal outer periphery 21 for receiving a wrench. It has three pins 22 extending outwardly from its face 24' which are the same distance from the axis of rotation 14' as arcuate grooves 18. Pins 22 are placed in grooves 18 and key 20 is turned clockwise in FIG. 5 until they abut shoulders 19. A bolt 23 is inserted through bore 24 in key 20 and threads into internal threads 25 in bore 44 of body 11 to lock key 20 to plug 10. Thereafter, a wrench can be applied to the hexagonal outer periphery 21 to tighten plug 10 into the position shown in FIG. 3. Threads 12 and 13 are pipe threads and are therefore tapered so that the more plug 10 is turned into pipe 14, the tighter it becomes lodged therein. Preferably plug 10 is inserted in pipe 14 so that face 15 is recessed for one or two threads from pipe edge 26. Causing plug 10 to lodge tightly in threads 13 to provide a gas-tight seal with face 15 recessed a desired amount is achieved by making threads 12 slightly oversize so that they will bind with threads 13. Thereafter, bolt 23 is unthreaded and key 20 is removed from mating engagement with plug 10. Since ramps 16 descend into body 11 in the direction of tightening threads 12, the plug 10 cannot be loosened from its lodged position in pipe 14 by applying unthreading forces to ramps 16 because the tool which is used merely cams out of the ramps.

Figure 4A:
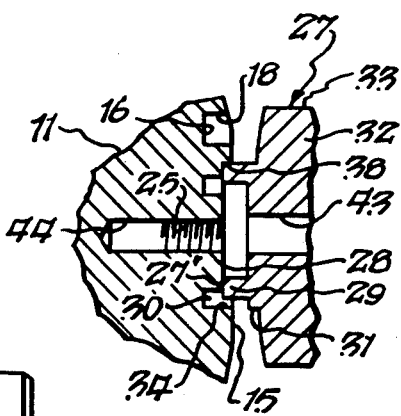
Figure 4:
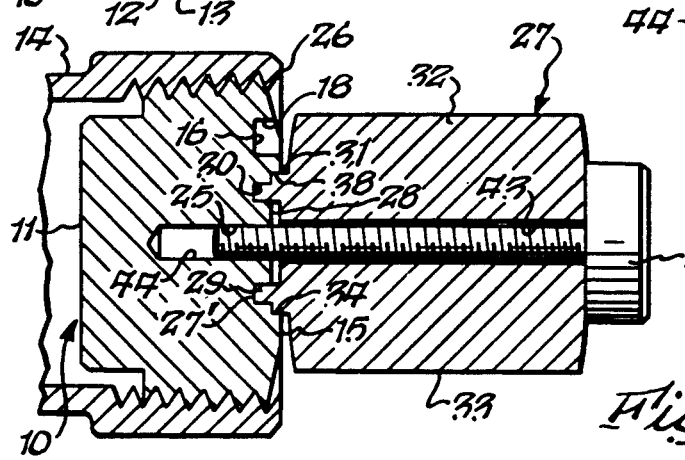
FIG. 4 is a cross sectional view showing the plug removing key in assembled relationship with the plug for unscrewing the plug from the pipe.

Plug 10 can only be removed by the use of a special key 27 which has an endless curvilinear ridge 29 which mates with endless curvilinear groove 30 which is located in face 15 of plug 10 and is oriented about axis 14'. Curvilinear ridge 29 is mounted on cylindrical base 31 which extends outwardly from key body 32 having an outer hexagonal periphery 33. Points A, B, C, D and E of curvilinear ridge 29 lie on a circumference of a circle which fits closely with cylindrical inner surface 3$ of counterbore 34 in plug 10. Therefore, when ridge 29 is first placed into counterbore 34 it will be centered relative to the axis 14' of plug 10 even though ridge 29 does not yet mate with groove 30. This is shown in FIG. 4A. In this respect parts of the end surface 27' of ridge 29 will rest on island 28 within groove 30 and on seats 36, 37, 39, 40 and 41 which lie within counterbore 34 and in the same plane as island 28. However, since the cylindrical inner surface 38 of counterbore 34 centers key 27 by engaging with points A, B, C, D and E, it is merely necessary to rotate the key 27 about its longitudinal axis while the outer edges at points A, B, C, D and E of ridge 29 are guided by cylindrical surface 38 until ridge 29 drops into mating groove 30. In this position, the cylindrical outer surface of base 31 will also be contiguous to internal cylindrical surface 38 of the counterbore and this contiguous abutting relationship will aid in stabilizing the key relative to the plug. At this time, the key 27 may be held and a wrench applied to the outer hexagonal periphery 33 to unscrew plug 10. However, preferably a bolt 42 may be inserted through bore 43 in body 32 of key 27 and thereafter threaded into threads 25 of bore 44 to hold key 27 and plug 10 in assembled mating relationship. Thereafter, a wrench can be applied to the hexagonal outer surface 33 of key 27 to unthread plug 10 from pipe 14. It is to be noted that the axial length of counterbore 34 is extremely short so that an expanding type of tool cannot be forced into engagement with side 38 for unscrewing plug 10.

Key 20, which is used to install plug 10 into pipe 14, cannot be used to unscrew it from pipe 14 even when bolt 23 fastens key 20 to plug 10. In this respect, the bore 44 in which internal threads 25 are located is oversize relative to the threads 46 of bolt 23 so that only the top portions 45 (FIG. 9) of threads 46 of bolt 23 engage internal threads 25. When the plug 10 is initially installed, it is installed with a torque of 50 foot pounds. If an attempt should be made to turn key 20 when it is locked to body 11 by bolt 23, pins 22 will tend to ride up ramps 16 toward the surface of face 15 to thereby to move key 20 away from face 15. A point will be reached where the tips 45 of the threads 46 on bolt 23 will be stripped because of their partial connection with threads 25 as shown in FIG. 9. This stripping is calculated to occur at about 20 foot pounds. It can therefore be seen that installing key 20 cannot be used to unscrew plug 10 from pipe 14. The value of having partial engagement between threads 46 and internal threads 25 can be more fully appreciated by reference to FIG. 10 which shows the normal threaded connection between a bolt 23' and a body 11' when the threads are in proper mating relationship rather than occupying the partial mating relationship of FIG. 9.

In FIGS. 11 and 12 certain portions of the present invention are shown in conjunction with frustoconical nut 50 which may be of the type used on lugs 51 which are mounted on an automobile hub and on which a wheel rim is mounted. Frustoconical nut 50 has an outer frustoconical surface 52 and a tapped bore 53 by which nut 50 is screwed onto lug 51. The face 54 of nut 50 includes a counterbore 34' which is the same as counterbore 34 of FIG. 5. Island 28' and bases 36', 37', 39', 40' and 41' are coplanar and are located at the inner end of counterbore 34'. Island 28' is bounded by groove 30'. The primed numerals represent structure which is the same as structure represented by the unprimed numerals of FIG. 5. Curvilinear groove 30' is for receiving a mating ridge, such as 29 of key 27 of FIG. 8. It can thus be seen that provision is made in the embodiment of FIGS. 11 and 12 for facilitating the centering of the ridge on a key, such as 27, relative to the groove 30', whereby all that is required to engage a groove 30' with a ridge 29 of a key is to insert the ridge 29 within the counterbore 34' and rotate it until the ridge 29 drops into mating engagement with groove 30', and when the latter occurs, the outer periphery of cylindrical base 31 will be contiguous to cylindrical counterbore surface 38'. In a nut such as shown in FIGS. 11 and 12, it is not necessary to have arcuate grooves such as 18. However, for certain applications, such grooves may be incorporated into the nut.

In FIG. 13 a modified embodiment of FIGS. 11 and 12 is shown which has a tapped bore 55 for receiving a bolt, such as 42, to lock the key 27 and nut 50' in assembled relationship.

The plug and nuts which have been described above are fabricated of hardened steel so as to resist chiseling or drilling which may be attempted to remove them.

While preferred embodiments of the present invention have been disclosed, it will be appreciated that the present invention is not limited thereto but may be otherwise embodied within the scope of the following claims.

What is claimed is:

1. A body member having an axis of rotation, threads on said body member for mounting said body member on an object, a face on said body member which is transverse to said axis of rotation, undulating curvilinear key-receiving groove means in said face, a mating key counterbore means having a side in said face in alignment with said curvilinear key-receiving groove means for engaging said mating key and permitting said mating key to rotate relative to said body member while in contact with said side prior to alignment of said mating key with said curvilinear key-receiving groove means prior to entry of said mating key into said curvilinear key-receiving groove means and to permit said mating key to enter into said curvilinear key-receiving groove means after alignment between said mating key and said curvilinear key-receiving groove means, curvilinear ridge means on said mating key for mating engagement with said curvilinear groove means, said curvilinear ridge means having spaced outer circumferential areas for engagement with said side of said counterbore means to align said curvilinear ridge means relative to said curvilinear key-receiving groove means during rotation of said mating key, a base on said mating key, said curvilinear ridge means being mounted on said base, and said base having an outer surface with a circumference which provides a close fit with said side of said counterbore means, whereby said outer surface of said base is in contiguous relationship to said side of said counterbore when said curvilinear ridge means is in said curvilinear groove to thereby stabilize said curvilinear ridge means in said curvilinear key-receiving groove means.

2. A body member having an axis of rotation, threads on said body member for mounting said body member on an object, a face on said body member which is transverse to said axis of rotation, undulating curvilinear key-receiving groove means in said face, a mating key counterbore means having a side in said face in alignment with said curvilinear key-receiving groove means for engagement said mating key and permitting said mating key to rotate relative to said body member while in contact with said side prior to alignment of said mating key with said curvilinear key-receiving groove means prior to entry of said mating key into said curvilinear key-receiving groove means and to permit said mating key to enter into said curvilinear key-receiving groove means after alignment between said mating key and said curvilinear key-receiving groove means, a plurality of arcuate ramps located outwardly of said counterbore means, each of said ramps having a first end and a second end which terminates at a shoulder in said body, each of said ramps having an inclined surface which leads away from said face and extends a greater distance into said body member as it progresses toward said second end from said first end, a second key for rotating said body member, said second key including a plurality of pin means for bearing against said shoulders and rotating said body member in a predetermined direction, said mating key including ridge means for mating engagement with said curvilinear groove means, a base on said mating key, said ridge means being mounted on said base, said base being of a circumference to provide a close fit with said side of said counterbore means when said ridge means is in said curvilinear groove means to stabilize said ridge means in said curvilinear groove means.

3. A body member as set forth in claim 2 wherein said curvilinear ridge means has outer circumferential areas for engagement with said side of said counterbore means in align said ridge means relative to said curvilinear groove means upon rotation of said mating key.

4. A body member as set forth in claim 2 including a first bore in said body member, internal threads in said first bore, a second bore in said mating key, a threaded bolt extending through said second bore and into said body member, and threads on said threaded bolt for mating enagement with said internal threads.

5. A body member and key combination comprising a body having an axis, a face on said body, a plurality of shoulders on said face, threads on said body having a tightening direction which is the direction experienced when forces are applied to said shoulders, a key, a plurality of members on said key for bearing against said shoulders to turn said body in the tightening direction of said threads, a first bore in said key, a second bore in said body, internal threads in said second bore, a bolt in said first bore, external threads on said bolt for engagement with said internal threads to lock said key to said body when said plurality of members of said key bear against said shoulders to turn said body in the lightening direction of said threads, said internal threads being oversize relative to said external threads of said bolt whereby only the outer ends of said external threads engage said internal threads so that when said key is turned in a direction away from said shoulders in an attempt to unthread said body member out of a member when said external threads are in engagement with said internal threads, said external threads will be stripped before said body can be turned out of said member into which it has been threaded.

6. A body member having an axis of rotation, threads on said body member for mounting said body member on an object, a face on said body member which is transverse to said axis of rotation, a curvilinear key-receiving groove in said face, a counterbore in said face surrounding said groove, a plurality of arcuate ramps located outwardly of said counterbore, each of said ramps having a first end and a second end which terminates at a shoulder in said body, each of said ramps having an inclined surface which leads away from said face and extends a greater distance into said body member as it progresses toward said second end from said first end, with a key for rotating said body member, said key including a plurality of pins for bearing against said shoulders to thereby rotate said body member in a predetermined direction, a second key for rotating said body member in a second direction which is opposite to said predetermined direction, said second key including a ridge for mating engagement with said curvilinear groove, a first bore in said body member, internal threads in said first bore, a second bore in said key, a threaded bolt extending through said second bore and into said first bore, and threads on said threaded bolt, said first bore being oversize relative to said threaded bolt so that only the outer edge portions of the threads on said threaded bolt engage said internal threads of said first bore and so that said threads on said threaded bolt will be stripped when said key is turned in a direction away from said shoulders while said threads on said threaded bolt are in engagement with said internal threads in said first bore.

7. A body member having an axis of rotation, threads on said body member for mounting said body member on an object, a face on said body member which is transverse to said axis of rotation, a curvilinear key-receiving grove in said face, a counterbore in said face surrounding said groove, a plurality of arcuate ramps located outwardly of said counterbore, each of said ramps having a first end and a second end which terminates at a shoulder in said body, each of said ramps having an inclined surface which leads away from said face and extends a greater distance into said body member as it progresses toward said second end from said first end, a key for rotating said body member, said key including a plurality of pins for bearing against said shoulders to thereby rotate said body member in a predetermined direction, a second key for rotating said body member in a second direction which is opposite to said predetermined direction, said second key including a ridge for mating engagement with said curvilinear groove, a base on said second key, said ridge being mounted on said base, said base being of a circumference to provide a close fit with said side of said counterbore when said ridge is in said curvilinear groove, said curvilinear ridge having outer circumferential areas for engagement with said side of said counterbore to center said ridge relative to said curvilinear groove, a first bore in said body member, internal threads in said first bore, a second bore in said key, a threaded bolt extending through said second bore and into said first bore, and threads on said threaded bolt, said first bore being oversize relative to said threaded bolt so that only the outer edge portions of the threads on said threaded bolt engage said internal threads of said first bore and so that said threads on said threaded bolt will be stripped when said key in turned in a direction away from said shoulders while said threads on said threaded bolt are in engagement with said internal threads in said first bore.

8. A body member having an axis of rotation, threads on said body member for mounting said body member on an object, a face on said body member which is transverse to said axis of rotation, undulating curvilinear key-receiving groove means in said face, a mating key counterbore means having a side in said face in alignment with said curvilinear key-receiving groove means for engaging said mating key and permitting said mating key to rotate relative to said body member while in contact with said side prior to alignment of said mating key with said curvilinear key-receiving groove means prior to entry of said mating key into said curvilinear key-receiving groove means and to permit said mating key to enter into said curvilinear key-receiving groove means after alignment between said mating key and said curvilinear key-receiving groove means, and bore means in said body member within said curvilinear groove means for receiving a threaded bolt of said mating key.

9. A body member and key combination comprising a body member having a longitudinal axis, means on said body member for securing said body member to an object, a first surface on said body member which is transverse to said longitudinal axis for being engaged by the end of a key, key-receiving depression means in said first surface, counterbore means in said body member, a second surface defining said counterbore means, said second surface being axially spaced on said body member from said first surface, a key, protuberance means on said key for entering said key-receiving depression means, a third surface on said protuberance means for engaging said first surface when said protuberance means is not aligned with said key-receiving depression means, and surface means on said protuberance means for engaging said second surface and permitting relative rotation therebetween while said third surface engages said first surface without axial movement between said protuberance means and said body member when said protuberance means is not aligned with and before said protuberance means enters said key-receiving depression means and for guiding said protuberance means into said key-receiving depression means as a result of axial movement therebetween after said alignment between said protuberance means and said key-receiving depression means has been effected.

10. A body member and key combination as set forth in claim 9 wherein said key-receiving depression means comprises an elongated channel-like groove, and wherein said protuberance means comprises an elongated ridge for entering said elongated channel-like groove.

11. A body member and key combination as set forth in claim 9 wherein said second surface is substantially cylindrical.

12. A body member and key combination as set forth in claim 11 wherein said key-receiving depression means comprises an elongated undulating channel-like groove, and wherein said protuberance means comprises an elongated undulating ridge of substantially complementary mating relationship with said elongated undulating channel-like groove.

13. A body member and key combination as set forth in claim 9 including a base on said mating key mounting said protuberance means, said base being axially spaced from said protuberance means, and a fourth surface on said base for engaging said second surface when said protuberance means is located in said depression.

14. A body member and key combination as set forth in claim 12 including a base on said mating key mounting said elongated undulating ridge and being axially spaced therefrom, and a fourth surface on said base for engaging said second surface when said elongated undulating ridge is located in said elongated undulating channel-like groove.

15. A body member and key combination as set forth in claim 9 wherein said key-receiving depression means comprises an undulating elongated channel-like groove, and wherein said protuberance means comprises an undulating elongated ridge for entering said elongated undulating channel-like groove, and wherein said second surface is substantially cylindrical, and wherein said surface means comprise a plurality of first spaced areas on said undulating elongated ridge which lie on a circle of slightly less diameter than said cylindrical second surface, and wherein said undulating elongated channel-like groove includes a plurality of second spaced areas which are essentially axial continuations of said cylindrical second surface for lying in contiguous relationship to said plurality of first spaced areas when said undulating elongated ridge lies within said undulating elongated channel-like groove.

16. A body member and key combination as set forth in claim 15 wherein said first surface is on an island-like portion which lies within said undulating elongated channel-like groove and said first surface includes a plurality of circumferentially spaced surfaces lying outside of said elongated undulating channel-like groove.

17. A body member and key combination as set forth in claim 15 including a base on said mating key mounting said undulating elongated ridge, said base being of a diameter which is slightly less than said substantially cylindrical second surface for lying in contiguous abutting relationship thereto when said undulating elongated ridge is in said elongated undulating key-receiving groove.

18. A body member and key combination as set forth in claim 9 wherein said first surface is substantially perpendicular to said longitudinal axis, and wherein said third surface is substantially parallel to said first surface when in engagement therewith, and wherein said second surface is substantially perpendicular to said first surface and substantially parallel to said longitudinal axis, and wherein said surface means is substantially parallel to said second surface when said third surface engages said first surface.

19. A body member and key combination as set forth in claim 18 wherein said key-receiving depression means comprises an undulating elongated channel-like groove, and wherein said protuberance means comprises an undulating elongated ridge for entering said elongated undulating channel-like groove, and wherein said second surface is substantially cylindrical, and wherein said surface means comprise a plurality of first spaced areas on said undulating elongated ridge which lie on a circle of slightly less diameter than said cylindrical second surface, and wherein said undulating elongated channel-like groove includes a plurality of second spaced areas which are essentially axial continuations of said cylindrical second surface for lying in continuous relationship to said plurality of first spaced areas when said undulating elongated ridge lies within said undulating elongated channel-like groove.

20. A body member and key combination as set forth in claim 9 wherein said key has a second longitudinal axis, and wherein said engagement of said surface means and said second surface aligns said second longitudinal axis with said longitudinal axis and maintains said longitudinal axes in said alignment while said relative rotation occurs.

* * * * *

UNITED STATES PATENT AND TRADEMARK OFFICE
CERTIFICATE OF CORRECTION

PATENT NO. : 5,062,325
DATED : November 5, 1991
INVENTOR(S) : Durham S. McCauley et al It is certified that error appears in the above-identified patent and that said Letters Patent is hereby corrected as shown below:

Column 2, line 24, change "wherein" to --therein--.

Column 5, line 34 (claim 2), change "engagement" to --engaging--.

Column 5, line 64 (claim 3), change "in" to --to--.

Column 7, line 24 (claim 7), change "in" (first occurrence) to --is--.

Signed and Sealed this

Twenty-third Day of February, 1993

Attest:

STEPHEN G. KUNIN

*Attesting Officer*    Acting Commissioner of Patents and Trademarks